United States Patent [19]

Takada et al.

[11] 4,289,104

[45] Sep. 15, 1981

[54] AIR-FUEL MIXTURE SUPPLYING DEVICE FOR INTERNAL COMBUSTION ENGINES

[75] Inventors: Shigetaka Takada, Ohbu; Masaaki Nomura, Okazaki; Manabu Itoh, Anjo, all of Japan

[73] Assignee: Aisan Industry Co., Ltd., Aichi, Japan

[21] Appl. No.: 78,741

[22] Filed: Sep. 25, 1979

[30] Foreign Application Priority Data

Oct. 2, 1978 [JP] Japan ................. 53-121316

[51] Int. Cl.³ ............................. F02M 51/06
[52] U.S. Cl. .................... 123/471; 123/472; 123/585; 261/DIG. 78; 261/DIG. 74; 261/DIG. 82; 261/78 R; 239/545
[58] Field of Search ............ 261/DIG. 78, DIG. 74, 261/DIG. 82, 78 R; 239/545, 421; 123/32 G, 102, 470, 472, 471, 585

[56] References Cited

U.S. PATENT DOCUMENTS

| 1,080,244 | 12/1913 | Whitten | 239/421 |
| 2,132,083 | 10/1938 | Pescara | 123/32 G |
| 2,247,759 | 7/1941 | Lemanski | 123/32 G |
| 2,638,330 | 5/1953 | Morgenroth | 261/47 |
| 3,539,102 | 2/1967 | Lang | 239/545 |
| 3,544,083 | 12/1970 | Currie | 261/DIG. 78 |
| 4,132,203 | 1/1979 | Elpern et al. | 261/DIG. 78 |

FOREIGN PATENT DOCUMENTS

| 2202699 | 8/1973 | Fed. Rep. of Germany | 261/DIG. 78 |
| 273329 | 2/1928 | United Kingdom | 123/32 G |
| 562243 | 6/1944 | United Kingdom | 123/32 G |
| 621785 | 8/1945 | United Kingdom | 239/421 |
| 570407 | 8/1977 | U.S.S.R. | 239/545 |

Primary Examiner—Tim R. Miles

[57] ABSTRACT

An air-fuel mixture supplying device for internal combustion engines, in which sonic nozzles are disposed facing each other in such a manner that their center lines lie in the same horizontal and vertical planes so that the fuel ejected from the nozzle is pulverized and mixed with bleed air ejected from the opposing nozzle in optimum condition. During intermittent ejection of fuel, two injector valves inject fuel alternately so that the fuel particles ejected from the opposing nozzles do not collide with each other but only strike against and mix with the bleed air. This eliminates the possibility of fuel particles becoming agglomerated and produces desirable air-fuel mixtures.

2 Claims, 8 Drawing Figures

AIR-FUEL MIXTURE SUPPLYING DEVICE FOR INTERNAL COMBUSTION ENGINES

BACKGROUND OF THE INVENTION

This invention relates generally to an air-fuel mixture supplying device for internal combustion engines and more specifically relates to improvements in pulverization of fuel and fuel distribution among cylinders of the engine.

In conventional air-fuel mixture supplying devices as shown in FIGS. 1, 2 and 3, injector valves 200 and 200' have fuel ejection ports 102 and 102' which open to a venturi portion 103 downstream of the throttle valve 101 and deviate by $\epsilon$ from each other as best illustrated in FIG. 1. The fuel is introduced into the fuel chamber 301 from the passage 303, and the return fuel is also introduced to the fuel chamber 301 through the passage 304. The fuel in the chamber 301 is then led to the inlets of the injector valves 200 and 200' through a passage 305. When the coils 204 and 204' of the injector valves 200 and 200' are energized, plungers 201 and 201' are retracted against the force of springs 205 and 205' thereby opening the delivery ports 202 and 202' from which a required amount of fuel corresponding to the quantity of air drawn into the engine is ejected.

Ejected fuel is pulverized by bleed air in the atomizing chamber and further pulverized while passing through sonic nozzles 203 and 203' before being ejected from the ejection ports 102 and 102'.

Since in the conventional method the ejection speed of fuel from ejection ports 102 and 102' is large, the ejected fuel does not easily mix with the air coming through the throttle valve 101. Further, since the ejection ports face each other in such a way that their center lines deviate from each other, the pulverized fuel particles strike the internal surface of the venturi portion 103 and adhere to it so that the diameters of the atomized fuel particles become large before they reach the combustion chamber of the engine. This will adversely affect the fuel distribution among the cylinders of the engine.

SUMMARY OF THE INVENTION

It is an object of the present invention to overcome the above-mentioned drawbacks by arranging the openings (outlets) of the sonic nozzles in such a manner that they oppose each other and controlling them such that air-fuel mixture from one nozzle strikes against bleed air from the opposed nozzle.

This invention is characterized by the fact that openings of the sonic nozzles oppose each other with their center lines lying in the same vertical plane and at least one nozzle is connected to the fuel injector valve. Further, this invention is characterized by the following features: the center lines of the openings of the sonic nozzles lie in the same vertical and horizontal planes; injectors are used as the fuel injector valves; both the opposing openings of the sonic nozzles are connected to the fuel injector valves which open alternately or in a staggered relation with each other.

DESCRIPTION OF THE PREFERRED EMBODIMENTS

The present invention will now be described with reference to the accompanying drawings.

Figure 4:
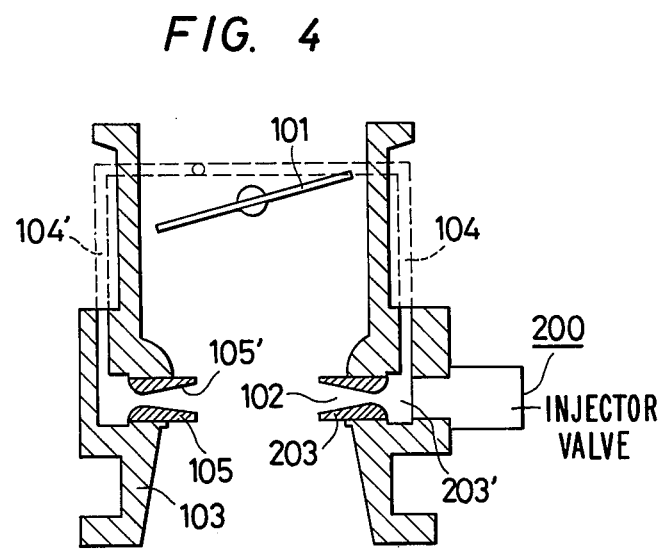
FIG. 4 is a cross-sectional view of an air-fuel supplying device according to the present invention with one fuel injector valve.

In FIG. 4, the injector valve 200 injects a required amount of fuel to the engine. The injected fuel mixes with the air introduced through the air bleed passage 104 and is pulverized while passing through the sonic nozzle 203. The atomized fuel is then ejected from the ejection port 102. The fuel mixture ejected from the ejection port 102 now collides against the bleed air which has been introduced from the air bleed passage 104' and accelerated at the sonic nozzle 105, with the result that the fuel mixture loses its horizontal velocity and at the same time diffuses in the venturi pipe 103. The diffused fuel mixture is then drawn into the combustion chamber of the engine while being mixed with the air coming through the throttle valve 101. The fuel may be injected either continuously or intermittently by the injector valve 200. If the sonic nozzle 105 were not provided, the fuel particles atomized by the sonic nozzle 203 would adhere to the venturi pipe 103 or combine to form larger fuel particles before being mixed with the air. This will not only deteriorate the fuel distribution among cylinders in the engine but also reduce the accelerating performance of the engine. However, the fuel supplying device according to this invention eliminates the above drawbacks and improves the fuel distribution among cylinders in the engine since the fuel mixture ejected from the ejection port 102 is slowed down and diffused by the bleed air ejected from the sonic nozzle 105.

Figure 5:
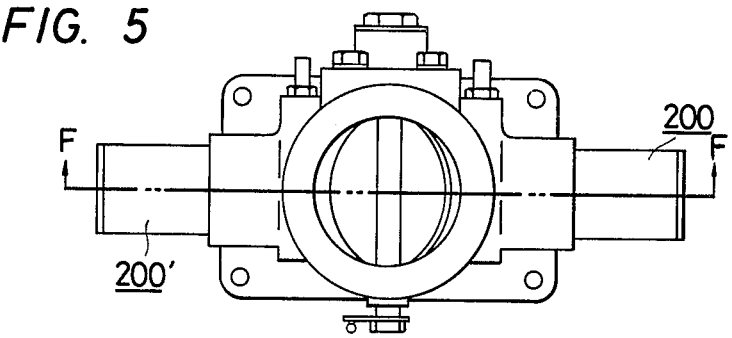
FIG. 5 is a plan view of an air-fuel supplying device according to the present invention with fuel injector valves fitted on both sides thereof.
Figure 6:
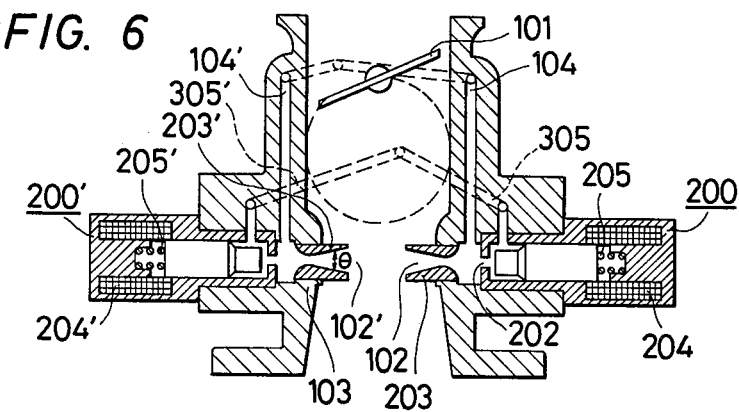
FIG. 6 is a cross-sectional view taken along the line F—F of FIG. 5.

Referring to FIGS. 5 and 6, the injector valves 200 and 200' inject the required quantities of fuel. The injected fuel is mixed with the bleed air passing through the air bleed passages 104 and 104', pulverized at the sonic nozzles 203 and 203' and ejected from the ejection ports 102 and 102'. The ejected fuel particles collide with the bleed air ejected from the opposing ejection ports 102 and 102' so that the fuel particles lose their horizontal speed and are diffused in the venturi pipe 103. While being drawn into the engine, the atomized fuel is further mixed with the air passing through the throttle valve 101.

Since the sonic nozzles 203 and 203' are disposed facing each other, the bleed air and the fuel particles are ejected against each other from the sonic nozzles 203 and 203' to produce the same effect as obtained in the air-fuel supplying device shown in FIG. 4.

The fuel mixture may be injected either continuously or intermittently from the injector valves 200 and 200'.

Figure 8:
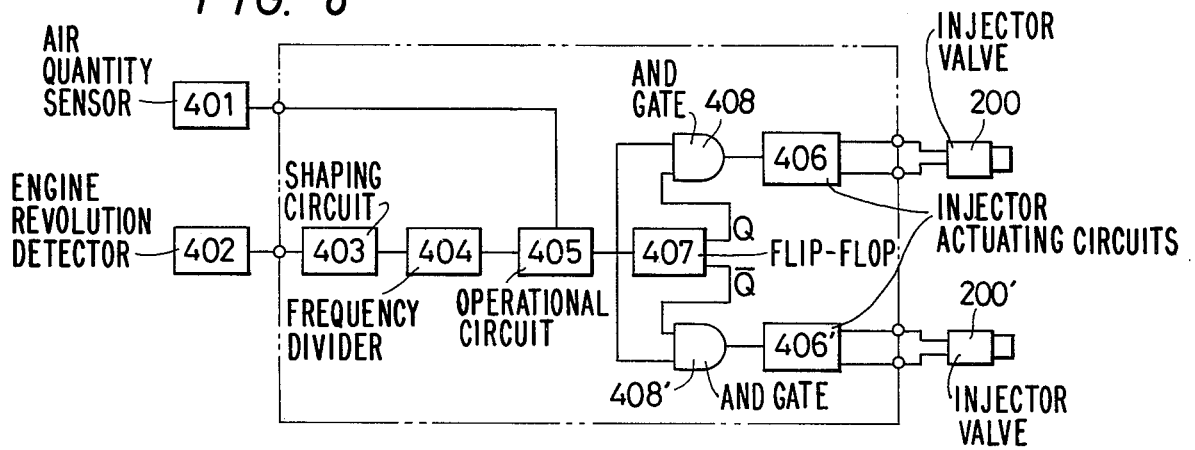
FIG. 8 is a block diagram of a control circuit.

For an intermittent injection of fuel, the air-fuel supplying device as shown in FIGS. 5 and 6 is provided with a driving circuit for injector valves 200 and 200' shown in FIG. 8 that actuates these two valves in such a manner that they do not inject fuel simultaneously.

Figure 7:
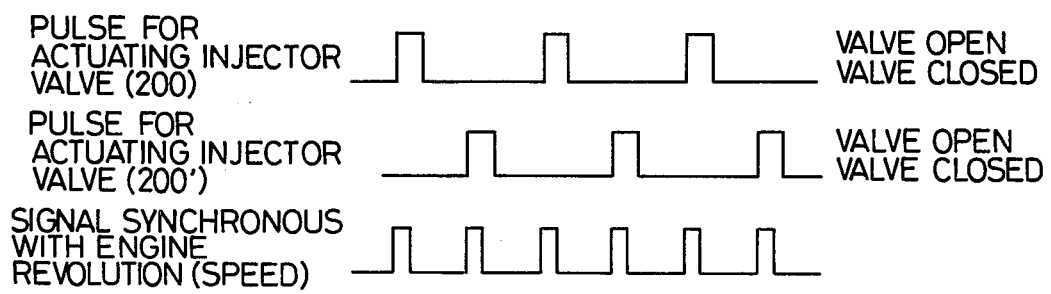
FIG. 7 is a timing chart diagram showing the operation of ejector valves of the present air-fuel supplying device.

In FIG. 8, a signal synchronous with the engine revolution is emitted from an engine revolution detector 402. After the wave form of the synchronous signal is shaped by a shaping circuit 403, the signal frequency is reduced to one-half by a frequency divider 404. An operational circuit 405 provides a pulse signal in synchronism with the signal from the frequency divider 404, the width of the pulse being proportional to the quantity, divided by the number of engine revolutions of air passing through the throttle valve 101. The quantity of air that passes through the throttle valve 101 is detected by an air quantity sensor 401 which transmits a signal to the operational circuit 405. The pulse signal from the operational circuit 405 is transferred to a flip-flop circuit 407 and AND gates 408 and 408' to alternately actuate injector actuating circuits 406 and 406'. The pulses for actuating the injector valves are illustrated in FIG. 7.

The injector valves 200 and 200' are so arranged that when the fuel is injected intermittently, these two injector valves do not inject fuel simultaneously. Therefore, the fuel particles ejected from the ejection ports 102 and 102' do not strike against and adhere to one another but only collide with the bleed air. This brings forth the same effect as obtained in the embodiment shown in FIG. 4 but in a greater degree.

Figure 1:
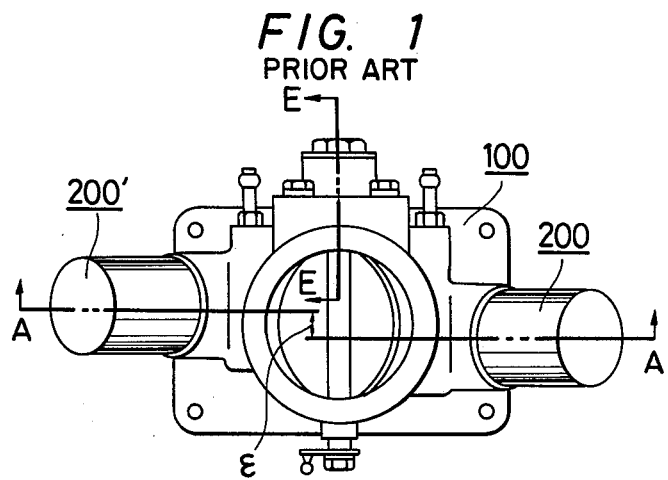
FIG. 1 is a plan view of a conventional air-fuel supplying device.
Figure 2:
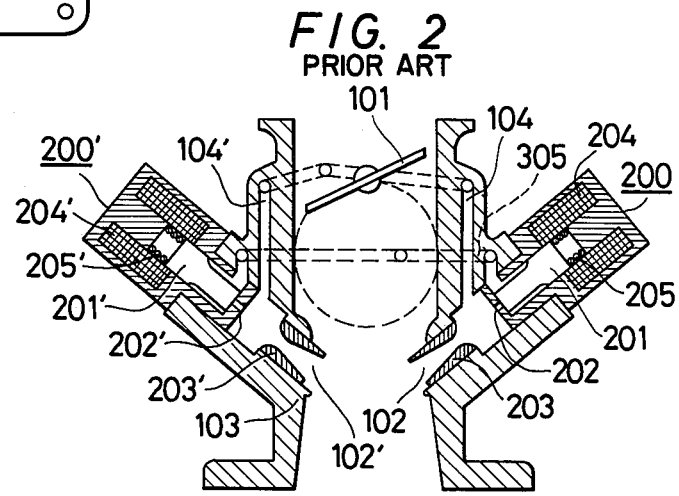
FIG. 2 is a cross-sectional view taken along the line A—A of FIG. 1.
Figure 3:
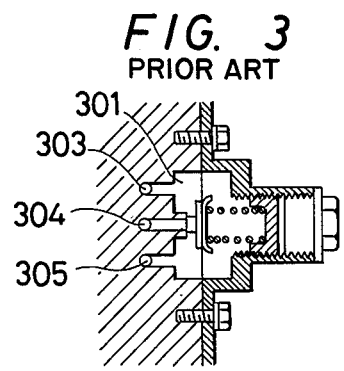
FIG. 3 is a cross-sectional view taken along the line E—E of FIG. 1.

It is desirable that the diffuse angles of the sonic nozzles 105, 203 and 203' are between 8° and 22°. While a small diffuse angle less than 8° is more effective in accelerating the fuel, the fuel particles are more likely to become agglomerated and therefore not easily atomized and mixed with air. For a diffuse angle of more than 22°, it is very likely that ejected fuel particles may adhere to the venturi portion 103 without mixing with the bleed air. The sonic nozzles 105, 203 and 203' may be inclined downwardly as shown in FIG. 2, although the horizontally disposed nozzles are most effective in atomizing the fuel by the bleed air, as shown in FIGS. 4, 5 and 6. However, if the tilting angle with respect to the horizontal plane exceeds 45°, the atomizing effect will be greatly reduced.

As can be seen in the foregoing, the air-fuel supplying device according to this invention eliminates the aforementioned drawbacks of the conventional device and can perform desirable pulverization of fuel so that the fuel distribution among the cylinders of the engine is improved.

What is claimed is:

1. In an air-fuel mixture supplying device for an internal combustion engine, having a throttle valve disposed in the intake system of the engine, a venturi portion provided at a downstream side of the throttle valve, a pair of sonic nozzle ports each opening at one of their ends, respectively, into both lateral sides of the venturi portion, mixing chambers provided at the other ends of the sonic nozzle ports and air bleed passages communicating with the other ends of the sonic nozzle ports and with a portion of the intake system upstream from the throttle valve, causing bleed air to pass into the venturi portion through said sonic nozzles ports, the mixing chambers being communicatable with the bleed air, the improvement comprising the openings of said one ends of said sonic nozzle ports oppose each other such that the centers thereof are located in a common vertical plane,
a fuel injector connected to the mixing chamber at the other end of one of said sonic nozzle ports,
each of said sonic nozzle ports has an angle of divergence ranging between 8° and 22°,
said openings of said sonic nozzle ports at said one ends oppose each other such that the centers thereof are located in said common vertical plane as well as in a common horizontal plane,
another fuel injector communicates with the mixing chamber at the other end of the other of said sonic nozzle ports,
means for actuating said fuel injectors, respectively, so as to have non-overlapping periods of actuation such that air-fuel mixture from one of said sonic nozzle ports, respectively, is injected into the venturi portion and strikes pure air bleed injected into the venturi portion from the other of said sonic nozzle ports, respectively, and alternatingly.

2. The air-fuel mixture supplying device as set forth in claim 1, wherein said means comprises an engine revolution detector and an air quantity sensor, an operational circuit means connected operatively to said detector and said sensor for providing a pulse signal having a width proportional to the quantity of air passing through the throttle valve per engine revolution, two injector actuator circuit means for actuating said first-mentioned fuel injector and said another fuel injector, respectively, two AND-gates respectively connected to said two injector actuator circuit means and with one input of both of said AND-gates connected to said operational circuit means, and a flip-flop having two alternative state outputs connected respectively to the other inputs of said AND-gates.

* * * * *